US006766299B1

(12) United States Patent
Bellomo et al.

(10) Patent No.: US 6,766,299 B1
(45) Date of Patent: Jul. 20, 2004

(54) SPEECH-CONTROLLED ANIMATION SYSTEM

(75) Inventors: Victor Cyril Bellomo, Palo Alto, CA (US); Eric Manaolana Herrmann, Larkspur, CA (US)

(73) Assignee: Thrillionaire Productions, Inc., Palo Alto, CA (US)

( * ) Notice: Subject to any disclaimer, the term of this patent is extended or adjusted under 35 U.S.C. 154(b) by 0 days.

(21) Appl. No.: 09/466,767

(22) Filed: Dec. 20, 1999

(51) Int. Cl.$^7$ .................. G10L 11/00; G10L 15/26; G10L 15/04
(52) U.S. Cl. .................. 704/276; 704/235; 704/254
(58) Field of Search ................ 345/643, 473; 434/185, 169; 704/276, 275, 270.1, 270, 262, 246, 235, 231

(56) References Cited

U.S. PATENT DOCUMENTS

| | | | | |
|---|---|---|---|---|
| 4,260,229 A | | 4/1981 | Bloomstein | 352/50 |
| 4,913,539 A | | 4/1990 | Lewis | 352/87 |
| 5,491,743 A | * | 2/1996 | Shiio et al. | 345/759 |
| 5,608,839 A | * | 3/1997 | Chen | 704/231 |
| 5,630,017 A | | 5/1997 | Gasper et al. | 395/2.85 |
| 5,657,426 A | | 8/1997 | Waters et al. | 704/276 |
| 5,734,794 A | | 3/1998 | White | 395/2.84 |
| 5,880,788 A | | 3/1999 | Bregler | 348/515 |
| 5,884,267 A | | 3/1999 | Goldenthal et al. | 704/276 |
| 5,899,971 A | | 5/1999 | De Vos | |
| 5,963,217 A | * | 10/1999 | Grayson et al. | 345/473 |
| 6,147,692 A | * | 11/2000 | Shaw et al. | 345/643 |
| 6,181,351 B1 | * | 1/2001 | Merrill et al. | 345/473 |
| 6,232,965 B1 | * | 5/2001 | Scott et al. | 345/473 |
| 6,366,885 B1 | * | 4/2002 | Basu et al. | 704/235 |

FOREIGN PATENT DOCUMENTS

EP 673170 A2 9/1995
WO WO/97/36288 10/1997

OTHER PUBLICATIONS

Shigeo Morishima et al: "An Intelligent Facial Image Coding Driven by Speech and Phoneme", IEEE Int'l Conf. on Acoustics, Speech & Signal Processing (ICASSP '89), pp. 1795–1798 (May 23, 1989), New York, NY, USA.
Shigeo Morishima et al: "A Facial Motion Synthesis for Intelligent Man–Machine Interface", Systems & Computers in Japan, US, Scripta Technical Journals, New York, vol. 22, No. 5, 1991, pp. 50–59.
Chou W et al.: "Speech Recognition For Image Animation and Coding", IEEE Int'l Conf. on Acoustics, Speech & Signal Processing (ICASSP '95), pp. 2253–2256 (May 9, 1995).
"Avatars" from Virtual Cities: Resource Center, Internet Page .casa.ucl.ac.uk/planning/avatars.html (This copy printed Dec. 20, 1999).
"Masquerade", Intenet Page hijinx.com.au/product.html (This copy printed Dec. 20, 1999).

* cited by examiner

Primary Examiner—Richemond Dorvil
Assistant Examiner—V. Paul Harper
(74) Attorney, Agent, or Firm—Mark J. Spolyar

(57) ABSTRACT

Methods, systems and apparatuses directed toward an authoring tool that gives users the ability to make high-quality, speech-driven animation in which the animated character speaks in the user's voice. Embodiments of the present invention allow the animation to be sent as a message over the Internet or used as a set of instructions for various applications including Internet chat rooms. According to one embodiment, the user chooses a character and a scene from a menu, then speaks into the computer's microphone to generate a personalized message. Embodiments of the present invention use speech-recognition technology to match the audio input to the appropriate animated mouth shapes creating a professional looking 2D or 3D animated scene with lip-synced audio characteristics.

29 Claims, 9 Drawing Sheets

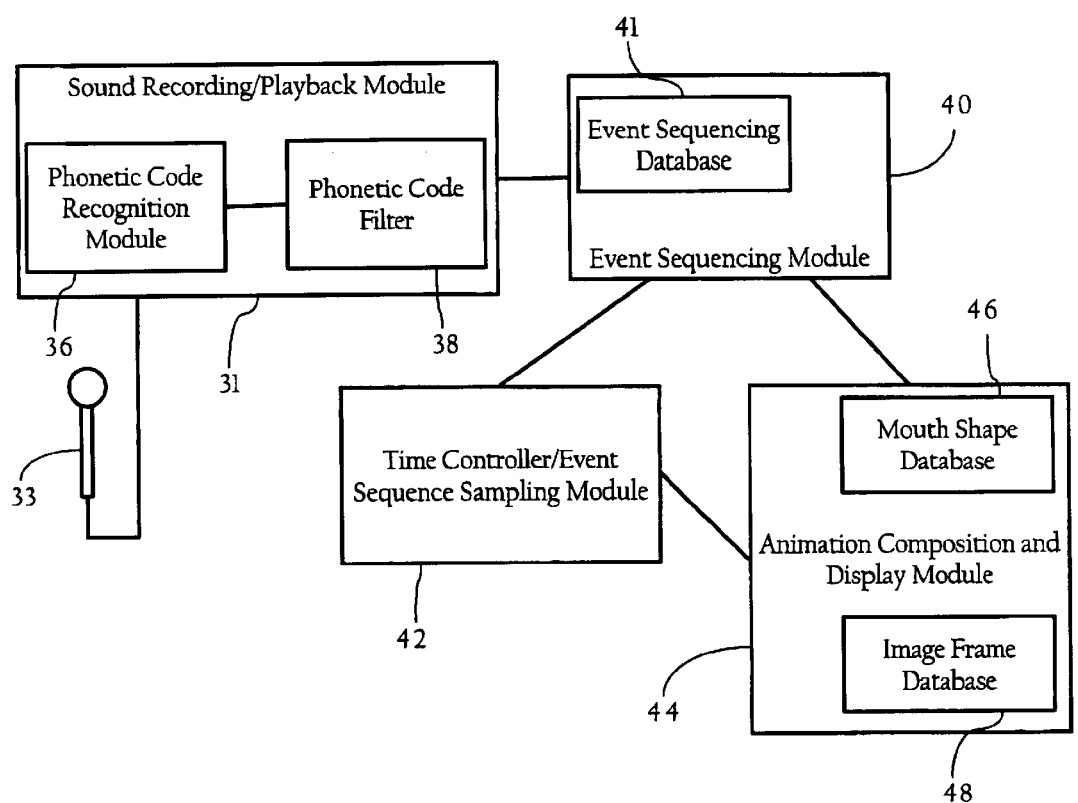
Fig._1

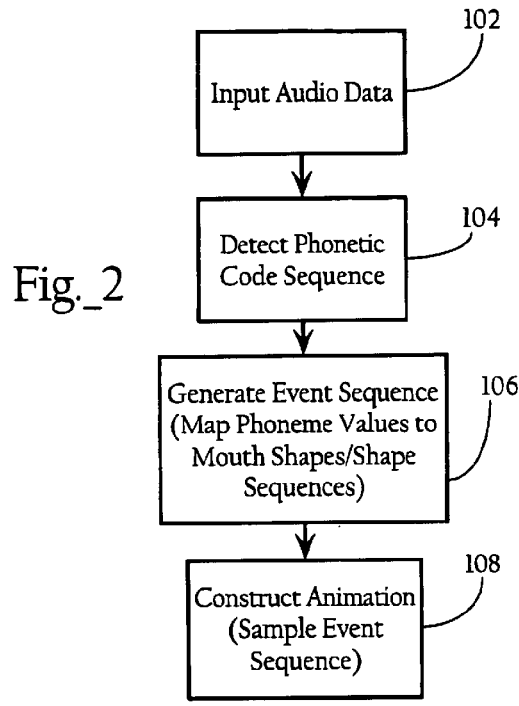
Fig._2
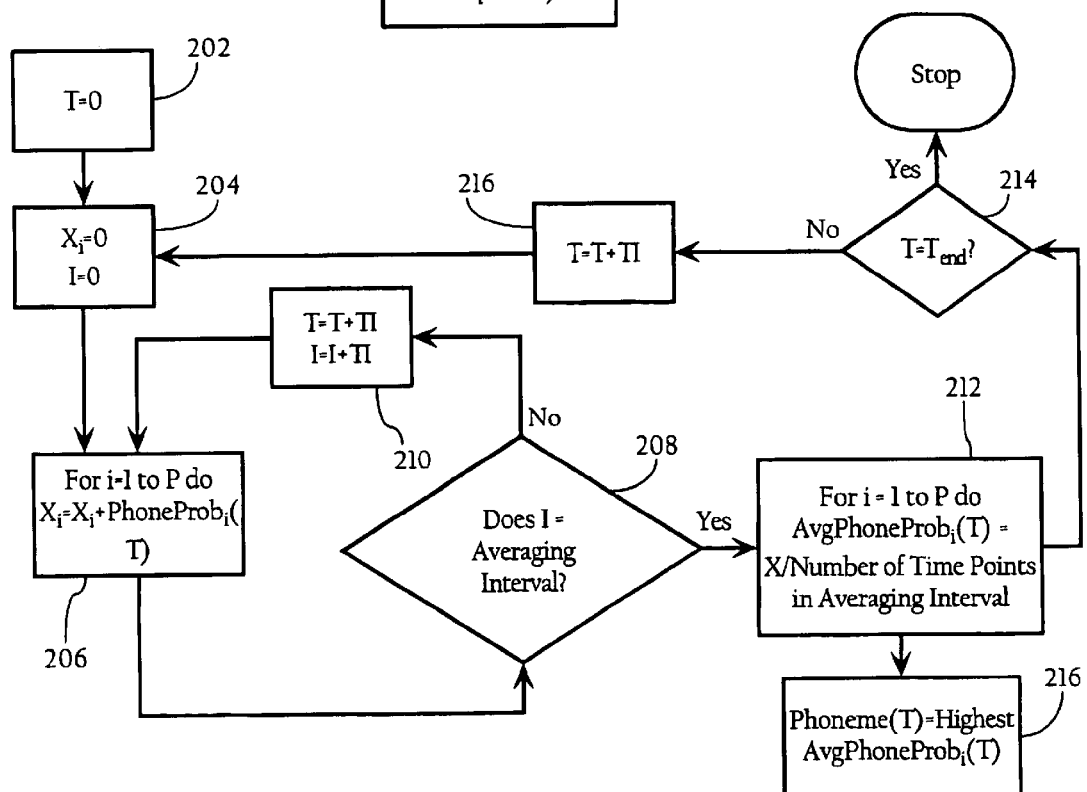
Fig._3

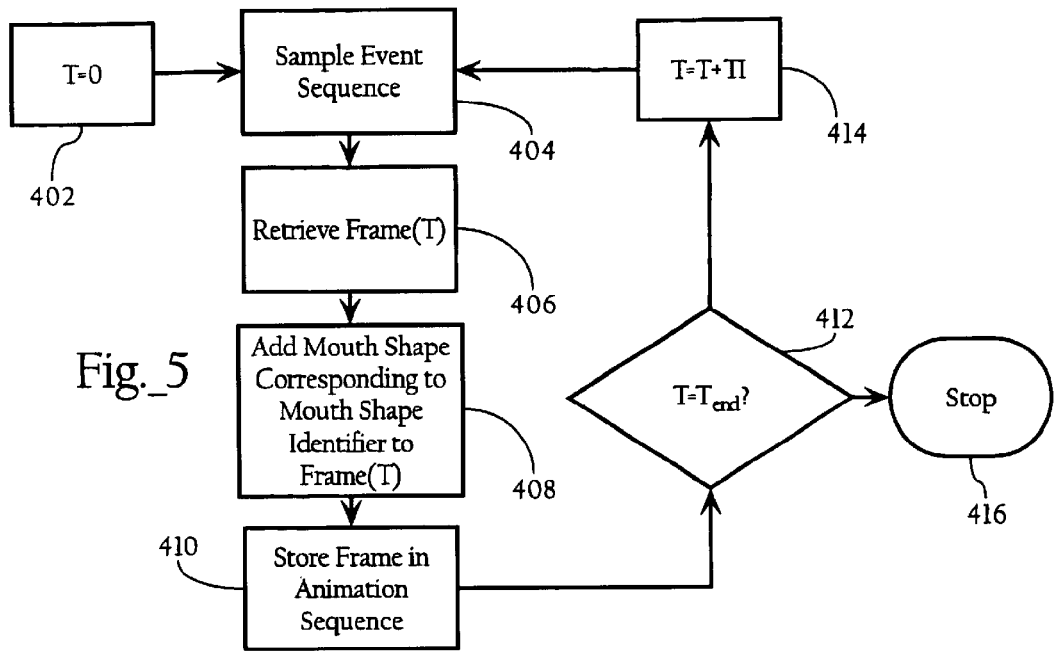
Fig._5
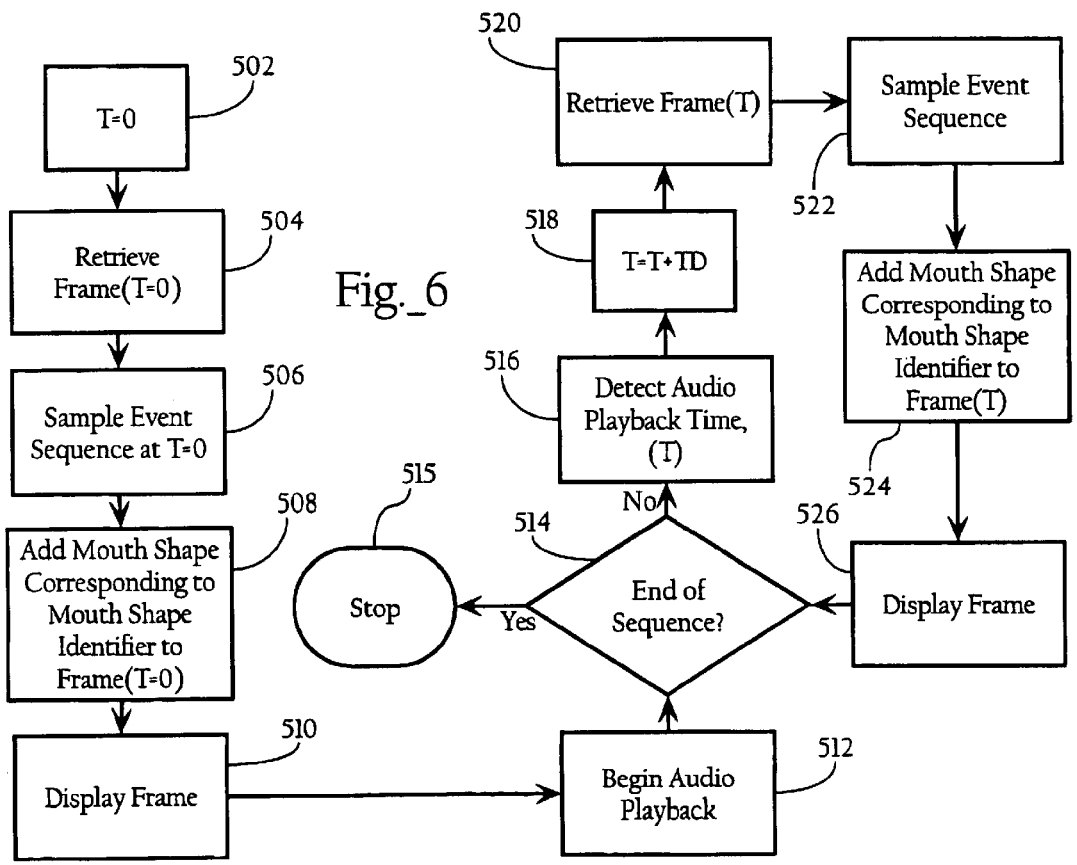
Fig._6

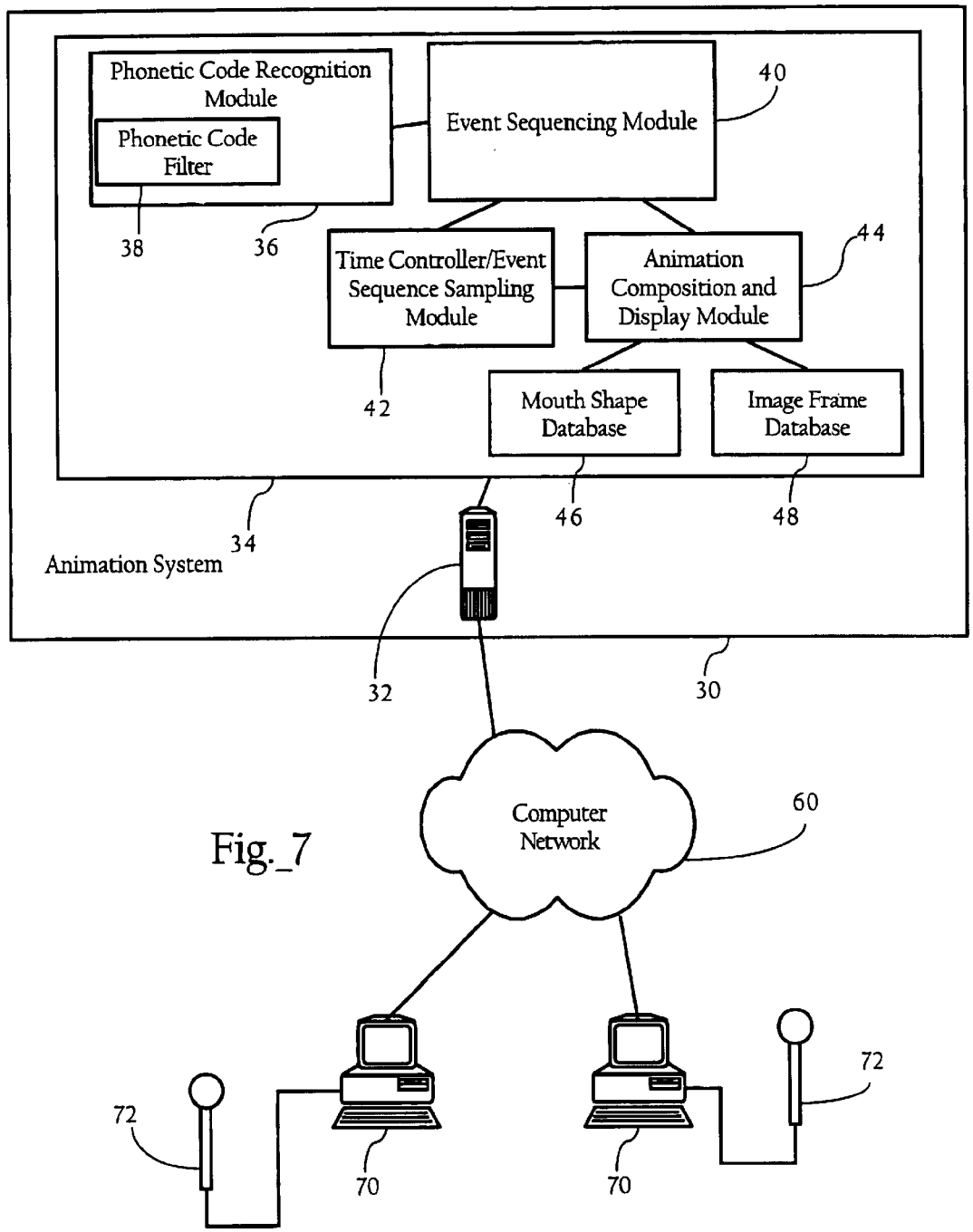
Fig._7

Fig. 9a - m2
Fig. 9b - m3
Fig. 9e - m6a
Fig. 9f - m6b
Fig. 9i - m8
Fig. 9j - m9
Fig. 9m - m11a
Fig. 9n - m11b
Fig. 9q - m13a

Fig. 9c - m4          Fig. 9d - m5
Fig. 9g - m7a          Fig. 9h - m7b
Fig. 9k - m10a          Fig. 9l - m10b
Fig. 9o - m12a          Fig. 9p - m12b
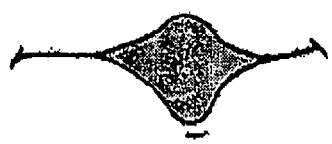
Fig. 9r - m13b

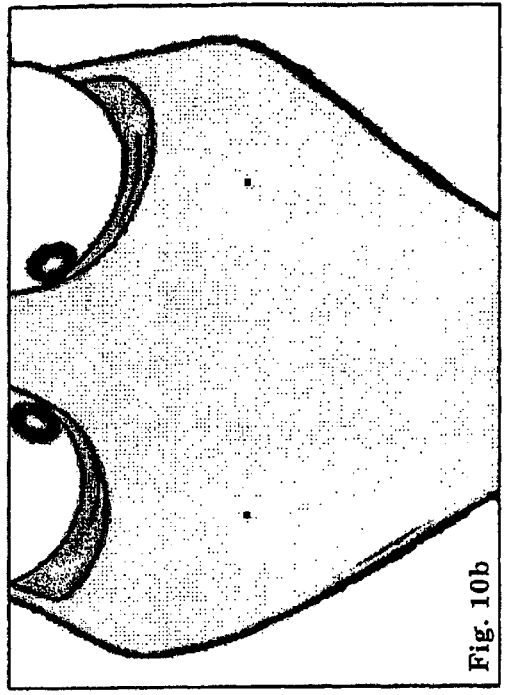
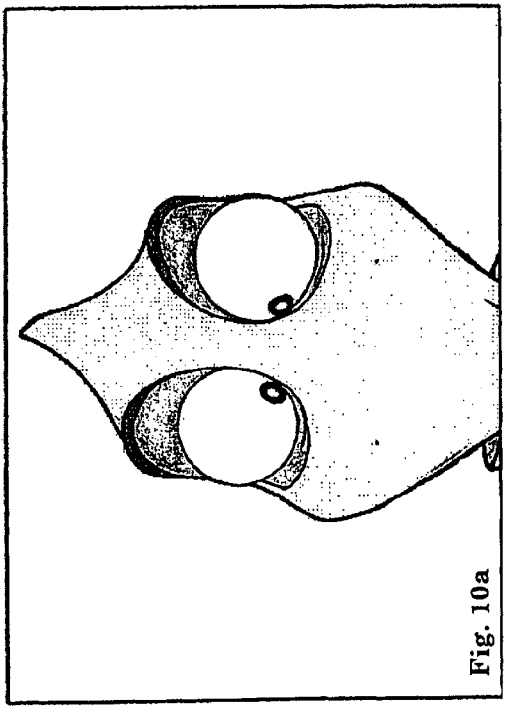
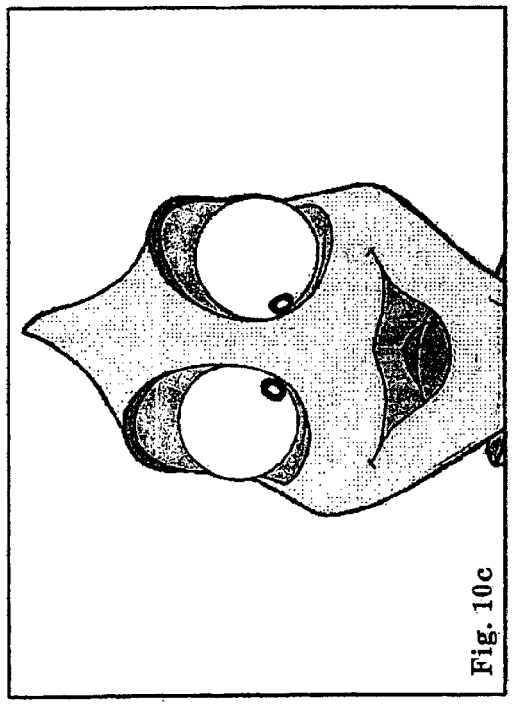
Fig. 10a
Fig. 10b
Fig. 10c

SPEECH-CONTROLLED ANIMATION SYSTEM

FIELD OF THE INVENTION

The present invention relates to animation systems and, more particularly, to a method and apparatus for generating an animated sequence having synchronized visual and audio components.

BACKGROUND OF THE INVENTION

Existing technology related to Internet communication systems includes such applications as pre-animated greetings, avatars, e-mail web based audio delivery and video conferencing. Originally, e-mail messages were sent through the Internet as text files. However, soon the commercial demand for more visual stimulus and the advances in compression technology allowed graphics in the form of short pre-animated messages with imbedded audio to be made available to the consumer. For example, software packages from Microsoft Greetings Workshop allow a user to assemble a message with pre-existing graphics, short animations and sound. These are multimedia greeting cards that can be sent over the Internet but without the voice or gesture of the original sender.

Existing software in the area of video conferencing allows audio and video communication through the Internet. Connectix, Sony Funmail and Zap technologies have developed products that allow a video image with sound to be sent over the Internet. Video Email can be sent as an executable file that can be opened by the receiver of the message without the original software. However, video conferencing requires both sender and receiver to have the appropriate hardware and software. Although video e-mail and conferencing can be useful for business applications many consiers have reservations about seeing their own image on the screen and prefer a more controllable form of communication.

In the area of prior art Internet messaging software, a variety of systems have been created. Hijinx Masquerade software allows text to be converted into synthetic voices and animated pictures that speak the voices. The system is designed to use Internet Relay Chat (IRC) technology. The software interface is complicated and requires the user to train the system to match text and image. The result is a very choppy animated image with mouth shape accompanied by a synthetic computer voice. The software is limited by its inability to relay the actual voice of its user in sync with a smooth animation. In addition, a Mitsubishi technology research group has developed a voice puppet, which allows an animation of a static image file to be driven by speech in the following manner. The software constructs a model using a limited set of the speaker's facial gestures, and applies that model to any 2D or 3D face, using any text, mapping the movements on to the new features. In order to learn to mimic someone's facial gestures, the software needs several minutes of video of the speaker, which it analyzes, maps and stylizes. This software allows a computer to analyze and stylize video images, but does not directly link a user's voice to animation for communication purposes. Geppetto software also aids professional animators in creating facial animation. The software helps professionals generate lip-sync and facial control of 3D computer characters for 3D games, real-time performance and network applications. The system inputs the movement of a live model into the computer using motion analysis and MIDI devices. Scanning and motion analysis hardware capture a face and gestures in real time and then records the information into a computer for animation of a 3D model.

Prior art software for Internet communication has also produced "avatars", which are simple characters that form the visual embodiment of a person in cyberspace and are used as communication and sales tools on the Internet. These animations are controlled by real time commands, allowing the user to interact with others on the Internet. Microsoft's V-Chat software offers an avatar pack, which includes downloadable characters and backgrounds, and which can be customized by the user with a character editor. The animated character can be represented in 3D or in 2D comic style strip graphic with speech bubbles. It uses the Internet Relay Chat (IRC) protocol and can accommodate private or group chats. The user is required to type the message on a keyboard and if desired choose an expression from a menu. Accordingly, while chatting the user must make a conscious effort to link the text with the appropriate character expression, since the system does not automatically perform this operation. In addition, the animated characters do not function with lip-synced dialogue generated by the user.

A number of techniques and systems exist for synchronizing the mouth movements of an animated character to a spoken sound track. These systems, however, are mainly oriented to the entertainment industry, since their operation generally requires much technical sophistication to ultimately produce the animated sequence. For example, U.S. Pat. No. 4,360,229 discloses a system where recorded sound track is encoded into a sequence of phoneme codes. This sequence of phoneme codes is analyzed to produce a sequence of visual images of lip movements corresponding to the sound track. These visual images can then be overlaid onto existing image frames to yield an animated sequence. Similarly, U.S. Pat. No. 4,913,539 teaches a system that constructs a synchronized animation based upon a recorded sound track. The system disclosed therein uses linear prediction techniques, instead of phoneme recognition devices to code the sound track. This system, however, requires that the user "train" the system by inputting so-called "training utterances" into the system, which compares the resulting signals to the recorded sound track and generates a phonetic sequence.

Furthermore, speech-driven animation software has been developed to aid in the laborious task of matching specific mouth shapes to each phoneme in a spoken dialogue. LipSync Talkit and Talk Master Pro work as plugins for professional 3D animation programs such as 3D Studio Max and Lightwave 3D. These systems take audio files of dialogue, link them to phonemes and morph the 3D-speech animation based on facial bone templates created by the animator. Then the animation team assembles the remaining animation. These software plugins, however, require other professional developer software to implement their functionality for complete character design. In addition, they do not function as self-contained programs for the purpose of creating eech driven animations and sending these animations as messages through the Internet.

The user of prior art speech-driven animation software generally must have extensive background in animation and 3D modeling. In light of the foregoing, a need exists for an easy-to-use method and system for generating an animated sequence having mouth movements synchronized to a spoken sound track inputted by a user. The present invention substantially fulfills this need and a tool for automated animation of a character without prior knowledge of animation techniques from the end user.

SUMMARY OF THE INVENTION

The present invention provides methods, systems and apparatuses directed toward an authoring tool that gives users the ability to make high-quality, speech-driven animation in which the animated character speaks in the user's voice. Embodiments of the present invention allow the animation to be sent as a message over the Internet or used as a set of instructions for various applications including Internet chat rooms. According to one embodiment, the user chooses a character and a scene from a menu, then speaks into the computer's microphone to generate a personalized message. Embodiments of the present invention use speech-recognition technology to match the audio input to the appropriate animated mouth shapes creating a professional looking 2D or 3D animated scene with lip-synced audio characteristics.

The present invention, in one embodiment, creates personalized animations on the fly that closely resemble the high quality of hand-finished products. For instance, one embodiment of the present invention recognizes obvious volume changes and adjusts the mouth size of the selected character to the loudness or softness of the user's voice. In another embodiment, while the character is speaking, the program initiates an algorithm that mimics common human gestures and reflexes—such as gesturing at an appropriate word or blinking in a natural way. In one embodiment, the user can also add gestures, facial expressions, and body movements to enhance both the natural look of the character and the meaning of the message. Embodiments of the present invention also includes modular action sequences—such as running, turning, and jumping—that the user can link together and insert into the animation. The present invention allows several levels of personalization, from the simple addition of voice and message to control over the image itself. More computer-savvy users can scan in their own images and superimpose a ready-made mouth over their picture. The software can also accept user-created input from standard art and animation programs. More advanced audio controls incorporate pitch-shifting audio technology, allowing the sender to match their voice to a selected character's gender, age and size.

The present invention combines these elements to produce a variety of communication and animation files. These include a deliverable e-mail message with synchronized video and audio components that a receiver of the message can open without the original program, an instruction set for real-time chat room communications, and animation files for web, personal animation, computer game play, video production, training and education applications.

In one aspect the present invention provides a method for generating an animated sequence having synchronized visual and audio characteristics. The method comprises (a) inputting audio data; (b) detecting a phonetic code sequence in the audio data; (c) generating an event sequence using the phonetic code sequence; and (d) sampling the event sequence. According to one embodiment, the method further comprises (e) constructing an animation frame based on the sampling step (d); and (f) repeating steps (d)–(e) a desired number of times to create an animation sequence.

In another aspect, the present invention provides an apparatus for generating an animated sequence having synchronized visual and audio characteristics. According to this aspect, the apparatus comprises a mouth shape database, an image frame database, an audio input module, an event sequencing module, a time control module, and an animation compositing module. According to the invention, the audio input module includes a phonetic code recognition module that generates a phonetic code sequence from audio data. The event sequencing module is operably connected to the audio input module and generates an event sequence based on a phonetic code sequence. The time control module is operably connected to the event sequencing module and includes a sampling module, which samples the event sequence. The animation compositing module is operably connected to the sampling module and the mouth shape and image frame database. According to the invention, the animation compositing module is responsive to the time control module to receive an event sequence value, retrieve a mouth shape from the mouth shape database and an image frame from the image frame database, and composite the mouth shape onto the image frame.

DESCRIPTION OF THE DRAWINGS

FIG. 1 is a functional block diagram illustrating one embodiment of the apparatus of the present invention.

FIG. 2 is a flow chart setting forth a method according to the present invention.

FIG. 3 is a flow chart showing a method for filtering a phonetic code sequence according to the present invention.

FIG. 5 is a flow chart setting forth a method for constructing an animation sequence according to the present invention.

FIG. 6 is a flow chart diagram providing a method for use in real-time playback.

FIG. 7 is a functional block diagram illustrating application of the present invention to a computer network.

FIGS. 9A–9R illustrate mouth shapes each associated with a phoneme or set of phonemes.

FIGS. 10A, 10B, and 10C; FIG. 10A is an image of the head of an animated character; FIG. 10B is an enlarged portion of FIG. 10A and illustrates the registration pixels used in certain embodiments of the present invention; and, FIG. 10C is an image of the head of an animated character over which a mouth shape from one of FIGS. 9A–9R is composited to create an animation frame.

DETAILED DESCRIPTION OF THE INVENTION

Figure 4:
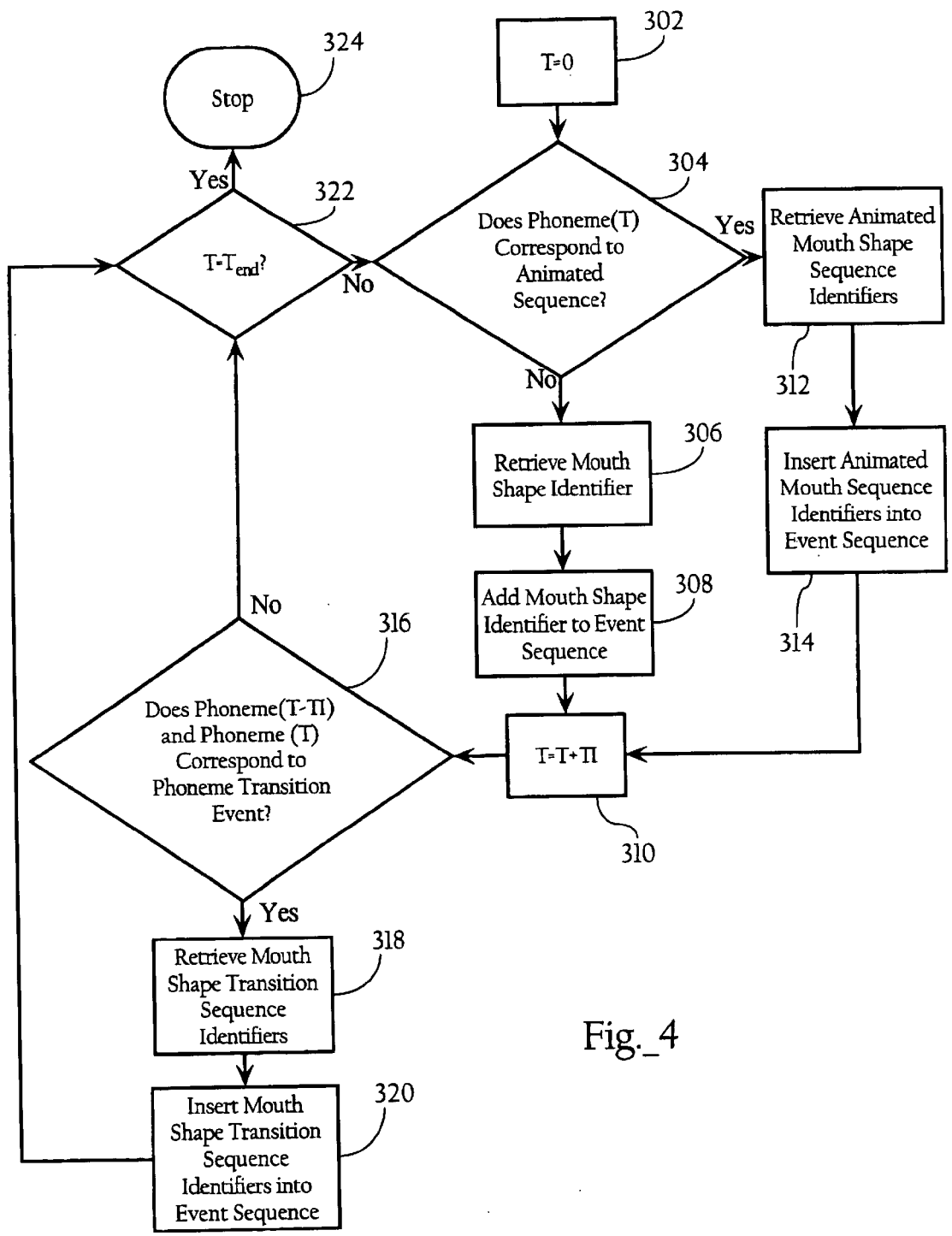
FIG. 4 is a flow chart illustrating a method generating an event sequence according to the present invention.

FIG. 1 illustrates an apparatus according to one embodiment of the present invention. As FIG. 1 shows, the apparatus, according to one embodiment, comprises audio module 31 operably connected to microphone 33, event sequencing module 40, time controller/sampling module 42, animation compositing and display module 44. The above-described modules may be implemented in hardware, software, or a combination of both. In one embodiment, the above-described modules are implemented in software stored in and executed by a general purpose computer, such as a Win-32 based platform, a Unix-based platform, a Motorola/AppleOS-based platform, or any other suitable platform. In another embodiment, the above-described modules are implemented in a special-purpose computing device.

A. Audio Module

According to one embodiment of the present invention, audio module 31 includes components for recording audio data and detecting a phonetic code sequence in the recorded audio data. As FIG. 1 shows, audio module 31 includes phonetic code recognition module 36 and phonetic code filter 38. According to this embodiment, phonetic code recognition module detects a phonetic code sequence in the audio data, while phonetic code filter 38 filters the detected phonetic code sequence.

1. Recording Audio Data and Phonetic Code Recognition

According to the invention, audio data is inputted into the apparatus of the present invention (FIG. 2, step 102). In one embodiment, a user speaks into microphone 33 to input audio data. Audio module 31 records the audio data transduced by microphone 33 and, in one embodiment, stores the recorded audio data in digital form, such as in WAV or MP3 file formats. Other suitable formats include, but are not limited to, RAM, AIFF, VOX, AU, SMP, SAM, AAC, and VQF.

Figure 8:
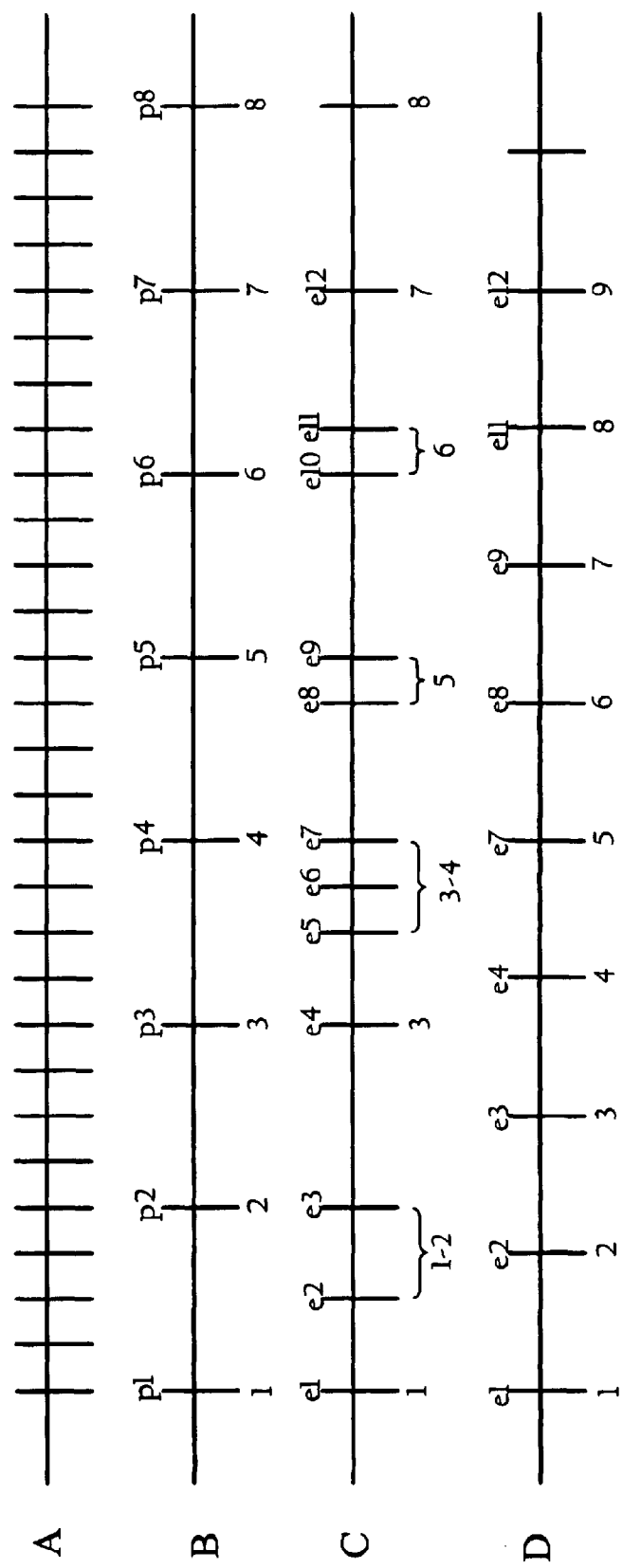
FIG. 8 provides four time lines illustrating, for didactic purposes, the sequencing and sampling steps according to one embodiment of the present invention.

According to the invention, phonetic code recognition module 36 analyzes and detects a phonetic code sequence in the audio data (FIG. 2, step 104). In one embodiment, phonetic code recognition module 36 detects a sequence of phonemes in the audio data. In one such an embodiment, phonetic code recognition module 36 detects a phoneme at a predetermined sampling or time interval. The time or sampling interval at which the audio data is analyzed can be any suitable time interval. In one embodiment, as time line A of FIG. 8 shows, a phoneme is detected in the audio data at 10 millisecond (ms) intervals.

In another embodiment, phonetic code recognition module 36 generates a phonetic code sequence comprising a set of phoneme probability values for each time interval. According to one such embodiment, phonetic code recognition module 36 generates, for each time interval, a list of all phonemes recognized by module 36 and a phoneme probability value indicating the likelihood that the corresponding phoneme is the actual phoneme recorded during the time interval. In one embodiment, the phoneme having the highest probability value is used for that time point. In another embodiment, and as discussed in Section A.2. below, these phonetic code probabilities, are averaged over an averaging interval. According to this embodiment, the phoneme having the highest probability value over the averaging interval is used as the phoneme for the averaging interval.

Suitable phonetic code recognition engines for use in the present invention include the BaBel ASR version 1.4 speaker-independent speech recognition system based on hybrid HMM/ANN technology (Hidden Markov Models and Artificial Neural Networks) from BaBel Technologies, Inc., Boulevard Dolez, 33, B-7000 Mons, Belgium. Another suitable device is sold under the trademark SPEECH LAB obtainable from Heuristics, Inc. Additionally, yet another suitable phoneme recognition engine is sole by Entropic, Inc. (recently acquired by Microsoft, Inc.). Of course, almost any available phoneme recognition engine can be used in the present invention.

In one embodiment, the volume level of the audio data is detected and recorded. In one form, the volume level is detected and recorded at the same sampling rate as phonetic code recognition. In one embodiment, this sequence of volume levels is used in connection with the phonetic code sequence to adjust the size and/or configuration of the mouth shapes during the animation. For example and in one embodiment, an "O" sound detected at a low decibel level may be mapped to a small "O" mouth shape, while a louder "O" sound will be mapped to a larger "O" mouth shape. (See discussion below.)

2. Filtering the Phonetic Code Sequence

In one embodiment, the phonetic code sequence is filtered. Any suitable algorithm for filtering the phonetic code sequence can be used.

FIG. 3 illustrates a filtering method for use in the present invention. In one embodiment, filtering is accomplished, as alluded to above, by averaging phoneme probability values over an averaging interval and selecting the phoneme having the highest average phoneme probability value. Time line B of FIG. 8 illustrates the time points (Ref. Nos. 1–8), relative to time line A, in the phonetic code sequence after it has been filtered. In the embodiment shown, the averaging interval comprises 4 time intervals, totaling 40 milliseconds of the unfiltered phonetic code sequence. According, the filtered phonetic code sequence, according to one embodiment, includes a phonetic code value for every 40 ms. Of course, any suitable averaging interval can be used.

More specifically and in one embodiment, the apparatus initializes the variables used in the averaging algorithm (FIG. 3, steps 202 and 204). As used in FIG. 3, T represents the time point in the audio data; TI represents the time or sampling interval between phonetic code sequences; and P is the number of recognized phonemes. As FIG. 3 indicates, starting at the first time point in the phonetic code sequence (T=0), the respective phoneme probability value (PhoneProb$_i$) for each recognized phoneme is added to accumulator (X$_i$) (FIG. 3, step 206) over an averaging interval (see FIG. 3, steps 208 and 210). At the end of each averaging interval, the average phoneme probability for each recognized phoneme (AvgPhoneProb$_i$) is calculated (FIG. 3, step 212). In one embodiment, the phoneme having the highest probability value is used as the phoneme for that time point in the filtered event sequence (FIG. 3, step 216). The averaging variables, X$_i$ and TI, are reset and the averaging process repeated for the duration of the phonetic code sequence (FIG. 3, steps 214, 216 and 204).

In another embodiment, phonetic code sequences are filtered to eliminate spurious phonetic code values. For example and in one embodiment, the phonetic codes detected over an averaging interval are compared. A set of rules or conditions is applied to the sequence to filter out apparently spurious values. According to one embodiment, if a particular phonetic code occurs only once over the averaging interval, it is filtered out of the phonetic code sequence.

B. Event Sequencing Module

Event sequencing module 40, in one embodiment, generates an event sequence based in part on the phonetic code sequence detected (and, in some embodiments, filtered) by audio module 31 (FIG. 2, step 106). In one embodiment, event sequencing module 40 applies a set of predetermined animation rules to the phonetic code sequence to create an event sequence that synchronizes the mouth shape animation with the audio data. In the embodiment shown in FIG. 1, event sequencing module 40 includes event sequencing database 41 that stores a set of animation rules. In one form, the animation rules comprise mouth shapes or sequences of mouth shapes each associated with one or more phonetic codes. In another embodiment, the animation rules further comprise mouth shapes or sequences of mouth shapes associated with a plurality of consecutive phonetic codes. In yet another embodiment, the animation rules further comprise mouth shapes or sequences of mouth shapes associated with phonetic transitions. In one embodiment, event sequencing module constructs an event sequence having a floating time scale in that the time interval between events is not uniform.

In one embodiment, event sequencing module builds a sequence of mouth shape identifiers by applying a set of animation rules to the phonetic code sequence. As discussed more fully below, the mouth shape identifiers point to files storing the various mouth shapes to be added to the animation in synchronization with the audio data. In addition, as discussed in section C., below, this sequence of mouth shape identifiers is subsequently sampled to construct an animated sequence (either in real-time or non-real-time modes). In one embodiment, the sequence of mouth shapes and corresponding volume data is sampled to construct an animated sequence.

In one embodiment using phonemes, each phoneme has associated therewith a particular mouth shape or sequence of mouth shapes. In another embodiment involving cartoon animation, for example, phonemes having similar mouth shapes are grouped together and associated with one event (mouth shape) or sequence of events (mouth shapes). In one embodiment, animated mouth shapes are stored in mouth shape database 46, each in a file having a mouth shape identifier.

TABLE 1

| Phoneme | Example | Mouth Shape ID |
|---|---|---|
| sil | <Silence> | m2 |
| a | apple | m11 |
| ay | aim | m11 |
| A | art | m11 |
| & | abut | m11 |
| uU | shut | m11 |
| @ | all | m11 |
| ee | easy | m10 |
| E | ever | m10 |
| r> | urge, her | m13 |
| I | ivy | m11 |
| i | ill | m6 |
| O | over | m7 |
| OU | ouch | m11 |
| OI | joy | m7 |
| U | wood | m13 |
| u | boot | m12 |
| y | yellow | m5 |
| b | bed, rib | m4 |
| ch | chop, itch | m3 |
| d | dock, sod | m5 |
| f | fan, off | m9 |
| g | go, big | m3 |
| h | hat | m3 |
| j | job, lodge | m5 |
| k | kick, call | m3 |
| l | loss, pool | m8 |
| m | map, dim | m4 |
| n | no, own | m5 |
| N | gong | m5 |
| P | pop, lip | m4 |
| r | rob, car | m13 |
| s | sun, less | m5 |
| SH | shy, fish | m13 |
| th | this, either | m5 |
| t | tie, cat | m5 |
| T | thin, with | m5 |
| v | vivid | m9 |
| w | we, away | m13 |
| z | zebra, raise | m5 |
| Z | mirage, vision | m3 |
| dd | ladder (flapped allophone) | m5 |

Table 1 provides an illustrative set of phonemes and mouth shapes or sequences of mouth shapes associated with each phoneme. The mouth shapes identifiers listed in Table 1 correspond to the mouth shapes of FIGS. 9A–9R. As Table 1 and FIGS. 9A–9R show, several phonemes are represented by the same mouth shape or sequence of mouth shapes. In addition, as Table 1 and FIGS. 9A–9R illustrate, certain phonemes, in some embodiments, are associated with a smaller mouth shape (e.g., m6*a*, m7*a*, m11*a*, etc.) and a larger mouth shape (m6*b*, m7*b*, m11*b*, etc.). (See FIGS. 9E and 9F.) In one embodiment, the smaller and larger mouth shapes are used as an animation sequence. In one embodiment, this sequence provides a smoother transition between mouth shapes and, therefore, a more realistic animation.

The set of associations in Table 1, however, is only one of myriad possibilities. The number of mouth shapes used to represent the various phonemes is primarily determined by the animator and the level of detail desired. So, for example, the word "cat" involves the "k", "a", and "t" phonemes, consecutively. According to the embodiment shown in Table 1, therefore, event sequencing module 40 will insert the m5, m11*a*, m11*b*, and m5 mouth shape identifiers into the event sequence at the appropriate time points. In addition, the number of phonemes recognized by the apparatus of the present invention is also a factor determined by the phoneme recognition engine used and the desired properties of the system.

FIG. 4 illustrates a method for generating an event sequence according to one embodiment of the present invention. Time line C of FIG. 8 shows an event sequence constructed from the phonetic code sequence of time line B. Beginning at the first time point (Time line B, Ref. No. 1) in the phonetic code sequence (FIG. 4, step 302), each phonetic code (Phoneme(T)) is analyzed to construct an event sequence. More specifically, if an animated sequence is associated with Phoneme(T) (FIG. 4, step 304), then event sequencing module 40 retrieves the sequence of mouth shape identifiers associated with the phoneme value from sequencing database 41 (FIG. 4, step 312) and inserts them into the event sequence. Otherwise, event sequencing module 40 retrieves a mouth shape identifier corresponding to the current phoneme (FIG. 3, step 306) and inserts it into the event sequence (step 308). In one embodiment, event sequencing module also inserts volume level data into the event sequence. As discussed more fully below, this volume level data can be used to scale the mouth shapes to represent changes in volume level of the audio data.

In one embodiment, event sequencing module 40 scans for certain, recognized transitions between phonetic codes. If a recognized phonetic code transition is detected, events (mouth shapes) are added to the event sequence as appropriate. More particularly and in one embodiment, event sequencing module 40 compares adjacent phonemes (FIG. 4, steps 310 and 316). If the particular pair of phonemes is a recognized transition event (step 316), event sequencing module retrieves the sequence of events (step 318) from event sequencing database 41 and inserts them into the event sequence. In other embodiments, event sequencing module 40 scans the phonetic code sequence for recognized groups of three or more phonemes and inserts events into the event sequence associated with that group in event sequencing database 41. In one embodiment, this loop is repeated for the duration of the phonetic code sequence (FIG. 4, steps 322 and 324).

FIG. 8, time lines B and C illustrate, for didactic purposes, a hypothetical event sequence generated by event sequencing module 40. In the embodiment shown in Table 1, a particular phoneme may have one or a plurality of events (mouth shapes) associated with it. In addition, a pair of adjacent/consecutive phonemes may also have a plurality of events associated with it. $P_i$, in FIG. 4, represents a particular phoneme value in the phonetic code sequence, Phoneme(T).

As time line C shows, P1 corresponds to one mouth shape identifier (E1), which is inserted into the event sequence. Event sequencing module 40 steps to the next time interval in the phonetic code sequence (FIG. 4, step 310) and compares P1 and P2 to determine whether these adjacent phonemes correspond to a transition event (step 316). As time line C indicates, one event (E2) is associated with the transition event and is inserted in the event sequence (steps 318 and 320). Event sequencing module then inserts event E3 corresponding to P2 at the next time interval (FIG. 4, steps 306 and 308). As E5 and E6 illustrate a plurality of events associated with a transition event can be inserted into the event sequence. The spacing of the events (E5 and E6) in the sequence can be spaced in time according to the desired animation effect. In addition, events E8 and E9 are an example of a sequence associated with one phoneme value P6. Similarly, events E10 and E11 are associated with a single phoneme value (P7); however, the sequence is inserted after the corresponding time point (6).

A sequence of mouth shapes, either associated with a phonetic transition or with an individual phonetic code, can be used to achieve a variety of purposes. For example, the individual phoneme for the "r" sound can be associated with a sequence of mouth shapes to provide the effect of vibrating lips or of providing some variation in the mouth shape, such that it does not appear static or fixed. In another embodiment, a pair of adjacent "r" phonemes can be associated with a sequence of mouth shapes that provides the effect of vibrating lips. In another example, a pair of adjacent "@" phonemes can be replaced with the m11a-m11b sequence. In yet another example, the phoneme corresponding to the "OI" phoneme can be represented by a sequence of mouth shapes inserted over the duration of the presence of the phoneme in the audio data to better mimic reality. In still another example, an animation rule can prescribe certain mouth shape sequences upon the occurrence of a certain phoneme. For example, if the "@" phoneme is encountered, an animation rule can cause event sequencing module 40 to add the smaller mouth shape, m11a, and then the larger mouth shape identifier, m11b, in the next two time points of the event sequence, such that the event sequence comprises m11a-m11b-m11b. Furthermore, the interval between mouth shape identifiers also depends on the characteristics of the desired animation.

1. Phonetic Transitions

As to phonetic transitions, animated mouth shape sequences can be used to reduce or eliminate the sharp mouth shape transitions that would otherwise occur and, therefore, make a more fluid animation. For example, a sequence of mouth shapes may be inserted at transition from an "m" phoneme to an "O" phoneme. According to one form, a sequence of mouth shapes, from closed, to slightly open, to half open, to mostly open, to fully open, is inserted into the event sequence. In other embodiments, the animated mouth shape sequence associated with a phonetic transition may comprise a number of time points in the phonetic code sequence. In such an embodiment, event sequencing module 40 is configured to insert the sequence at the appropriate location and overwrite existing mouth shapes in the event sequence. The particular animated sequences and phonetic associations, however, depend on the effect desired by the animator. Countless variations can be employed.

According to the mouth shape identification system employed in the embodiment, described above, the use of m#a identifies a mouth shape that is smaller than m#b. In the embodiment shown, only vowel phonemes include two mouth shapes. In one embodiment, a set of animation rules determines whether the larger or smaller mouth shape appears first. The following describes an illustrative set of animation rules:

a. Consonant-to-Vowel Transition

According to one embodiment of such animation rules, if a vowel phoneme follows a consonant, the smaller mouth shape of the vowel phoneme precedes the larger mouth shape. For example, the word "cat" results in a sequence of mouth shapes including m3, m11a, m11b and m5. Similarly, in embodiments involving more than two mouth shapes for a given vowel phoneme, the mouth shapes appear in ascending-size order.

b. Vowel-to-Consonant Transition

According to another animation rule, if a vowel precedes a consonant, any event sequence will end on the larger mouth shape. For example, the word "it" results in the sequence (m6a-m6b-m5).

c. Silence-to-Vowel Transition

According to a third animation rule, silence followed by a vowel requires that the smaller mouth shape, if any, be inserted into the event sequence before the larger mouth shape. For example, silence followed by "at" results in the sequence m2-m11a-m11b-m5.

d. Vowel-to-Silence Transition

In contrast, a vowel to silence transition, according to another rule, results in the opposite configuration of mouth shapes. For example, "no" followed by silence results in the sequence m5-m7a-m7b-m7a-m2.

e. Vowel-to-Vowel Transition

Pursuant to another animation rule, if a vowel-to-vowel transition is encountered, the larger mouth shape corresponding to the second vowel phoneme is used in the event sequence. For example, applying this rule and the vowel-to-consonant transition rule, above, to "boyish" results in the sequence m4, m7a, m7b, m6b, m13.

C. Time Controller/Sampling Module

Time controller/sampling module 42 samples an event sequence generated by event sequencing module 40 and, in one embodiment, drives animation compositing and display module 44. In one configuration, an embodiment of time controller/sampling module 42 periodically samples the event sequence at uniform sampling intervals to create an animated sequence. In one embodiment, time controller/sampling module 42 samples the event sequence according to a set of predetermined rules that adjust the resulting animation based in part upon the time constraints imposed (see discussion below).

FIG. 8, time line D illustrates the operation of an embodiment of time controller/sampling module 42 that, in one mode, periodically samples the event sequence at uniform intervals. According to the invention, the event sequence can be sampled at any desired rate necessary to achieve the desired animation. For example, cartoon animated sequences are typically animated at between 12 to 24 frames per second. Accordingly, the sampling rate or sampling interval (each a function of one another) can be adjusted according to the frame rate desired for the animation. For example, a cartoon animation sequence displayed at 24 frames per second requires a sampling interval of $\frac{1}{24}$th of a second (41.7 ms). However, in order to achieve smaller file sizes for animations intended to be transmitted over a computer network, a slower sampling rate, resulting in less frames per second, may be used. In addition, normal video output displays 30 frames per second. Accordingly, the event sequence, for use in such an embodiment, will be sampled every $\frac{1}{30}$th of a second (33.3 ms). Moreover, since the sampling of the event sequence does not depend on the sampling rate of the original audio data, the present invention allows for the same event sequence to be used in animations having different frame rates, without having to re-record the audio data, regenerate a phonetic code sequence, or recreate an event sequence.

1. Sampling/Animation Rules

According to one embodiment, time controller/sampling module 42 samples the event sequence according to a set of predetermined rules. In one embodiment, sampling module 42 maps to the most recent mouth shape identifier in the event sequence (See FIG. 8, time line D). In another embodiment, sampling module 42 maps to the event having the closest time value in the event sequence.

In yet another embodiment, the sampling rules adjust the resulting animation based upon the time constraints imposed by the sampling rate. For example and as time lines C and D of FIG. 8 demonstrate, the particular sampling rate used may cause time controller/sampling module 42 to omit or skip over certain mouth shapes in the event sequence. Accordingly and in one embodiment, time controller/sampling module 42 is configured to sample the event sequence according to a set of predetermined rules. The predetermined rules depend on the configuration and effect desired by the animator. Below are illustrative examples of sampling rules for use in an embodiment of the present invention.

a. Consonant to Vowel

According to one embodiment, one sampling rule requires that all possible sizes of mouth shapes for a vowel be sampled and used in constructing an animation, if possible. For example, the word "cat", according to Table 1 requires an m3-m11a-m11b-m5 mouth shape identifier sequence. If the particular sampling interval, however, does not allow for both the m11a and m11b mouth shapes to be used, a conditional rule requires that the m11b mouth shape, which is larger than the m11a mouth shape, be used, after the appearance of a consonant.

b. Vowel to Consonant

According to the set of animation rules described above, the word "it" is represented by the m6a-m6b-m5 mouth shape. According to an associated sampling rule, if the sampling rate does not allow for both the m6a and m6b mouth shapes, the larger mouth shape, m6b, is sampled and used to construct an animation frame. Therefore, the word "it" would be represented by the m6b and m5 mouth shape sequence.

c. Silence to Vowel/Vowel to Silence

According to the animation rules described above, silence followed by the word "at" results in an event sequence comprising m2, m11a, m11b and m5. As above, all mouth shapes are to be used when possible. If, however, the sampling rate prevents the use of all mouth shapes, a sampling rule causes the smaller vowel mouth shape, m11a, to be omitted. The resulting sequence that is sampled comprises m2, m11b, and m5. Similarly, the same sampling rule can be applied to a vowel to silence transition. For example, the word "no" followed by silence results in the mouth shape sequence comprising m5, m7b, m7a. Application of the sampling rule, when required, results in a sequence m5 to m7a.

D. Animation Compositing and Display Module

Animation compositing and display module 44, in one embodiment, receives an event sampled by time controller/sampling module 42 and constructs an animation frame responsive to the sampled event. As FIG. 1 shows, animation compositing and display module 44 includes mouth shape database 46 and image frame database 48. In one embodiment, users can select from among a plurality of animated characters and backgrounds from which to generate an animated sequence. According to such embodiment, mouth shape database 46 includes mouth shapes for one to a plurality of animated characters. For each animated character, mouth shape database 46 includes mouth shape identifiers pointing to files storing mouth shapes corresponding to phonetic codes or groups of phonetic codes. Image frame database 48 stores at least one sequence of image frames, each including a background region and a head without a mouth. As discussed below, mouth shapes are added to image frames to create an animation frame.

In one embodiment, the sampled event includes a mouth shape identifier and volume data. In one form of this embodiment, animation compositing and display module 44 scales the size of the mouth shape according to the volume data, before compositing it on the head of the character. For example, a higher volume phoneme, in one embodiment, corresponds to a larger mouth shape, while a lower volume phoneme corresponds to a smaller mouth shape.

1. Constructing an Animation Sequence

In one embodiment, animation compositing and display module 44 stores each resulting frame in an animation sequence. Specifically, FIG. 5 illustrates a method for sampling an event sequence and, frame by frame, constructing an animation sequence. In one embodiment, the sequence of image frames is intended to be displayed at 24 frames per second. Accordingly, sampling module 42 will sample the event sequence at 41.7 ms intervals. As to each frame, time controller sampling module 42 samples event sequence and, in one embodiment, passes the event to animation compositing module 44 (FIG. 5, step 402). Animation compositing and display module 44 retrieves the first image frame in the sequence stored image frame database 48 (FIG. 5, step 406). Animation compositing module 44 then retrieves the mouth shape corresponding to trampled event and adds it to the image frame to create an animation frame (FIG. 5, step 408). The resulting animation frame is then stored in an animation sequence (FIG. 5, step 410). In one embodiment, this animation frame compositing loop is repeated for the duration of the event sequence (FIG. 5, steps 412 and 414) to create an animation sequence. The resulting animation sequence and the audio data can then be assembled into a multimedia file, such as a QuickTime or AVI movie. Other suitable file formats include, but are not limited to, Macromedia Flash, Shockwave, and Things (see www.thingworld.com).

2. Registration of the Mouth Shape in the Image Frame

One embodiment uses registration marks to add the mouth shape to the image frame. (See FIG. 10.) The use of these registration marks allows the head to move relative to the frame as the animation sequence progresses, while still allowing for proper placement of the mouth shape. In one embodiment of the present invention, each frame in an animation sequence is a digital image. One form of this embodiment uses the Portable Network Graphics (PNG) format, which allows for storage of images of arbitrary size with 8 bits of red, green, blue and alpha (or transparency) information per pixel. However, any suitable image file format that supports transparency can be used in this embodiment of the invention. Other suitable formats include, but are not limited to, TIFF and TGA.

In one embodiment, the individual frames of the animation sequence are created by an animator using traditional techniques resulting in a set of image frames stored in digital form. According to the invention, the head of the animated character is drawn separately from the mouth. As discussed above, the appropriate mouth shape is added later to complete an animation frame. In one embodiment of the present invention, the head of the animated character is drawn separately from the background. In another embodiment, the head is drawn together with the background.

In one embodiment, each head frame has two pixels on it set to mark the left and right edges of the mouth. In one embodiment, the pixels are located proximally to the corners of the mouth. Of course, the location of the registration pixels is not crucial to the invention. According to this embodiment, the mouth shape also has two registration pixels corresponding to the pixels in the head frame. In one embodiment, the registration pixels in the mouth shape do not necessarily correspond to the corners of the mouth since the location of the mouth corners depend on the particular mouth shape. For example a smiling mouth shape has uplifted corners, while a frowning mouth shape has down turned corners. Still further, the mouth shape corresponding to an "o" phoneme may have corners that lie inside of the registration pixels.

In one embodiment, the registration pixels are set by choosing a pixel color that does not appear in any head or mouth image and, using that color, drawing the alignment pixels in the appropriate locations and storing either the image frame or the mouth shape. In one embodiment, when the image frame is subsequently loaded into memory, the image file is scanned to retrieve the x- and y-coordinates of the registration pixels (e.g., by looking for pixels having a predetermined color reserved for the registration pixels). The x- and y-coordinates corresponding to the registration pixels are stored. In one embodiment, the registration pixels are then overwritten with the color of the adjacent pixels to hide them from view. In another embodiment, the x- and y-coordinates of the registration pixels can be stored separately in another file, or as tagged data alongside the image frame. In one embodiment, the x- and y-coordinates of the registration pixels are stored as data in the object representing the bit map of the mouth shape or image frame.

When the image frame and mouth shape are combined, the registration pixels on the mouth shape are mapped onto the registration pixels on the head. In one embodiment, a mathematical algorithm is used to discover the 3×2 linear transformation that maps the mouth onto the head. The transformation matrix allows the mouth image to be rotated, scaled up or down, and moved, until the registration pixels align. In one embodiment, the transformation matrix is applied to the mouth shape using high-quality image re-sampling which minimizes artifacts such as aliasing. In one embodiment, the Intel Image Processing Software Library is used to perform the image transformation and compositing.

The effect of the alignment is that the mouth is positioned, rotated, and stretched over the background head, so that the mouth appears in the correct size and orientation relative to the particular head image. One embodiment introduces slight variation in the position of the registration points in order to make the animation appear more realistic. For example and in one embodiment, adding or subtracting a random value within 5 pixels of the original location of the registration pixels, will make the mouth appear to move slightly.

In another embodiment, volume data is used to scale the mouth shapes, resulting in a change in the distance between registration pixels on the mouth shape. In one form of this embodiment, the resulting mouth shape is laterally stretched or compressed such that the registration pixels of the mouth shape resume their original distance and, therefore, align with the registration pixels of the head. Accordingly, a higher volume phoneme results in a wider-opened mouth shape, while a lower volume phoneme results in a more narrowly opened mouth shape. In another embodiment, the mouth shapes are scaled without affecting the distance between registration pixels. In yet another embodiment, volume data is used to choose one from a set of differently sized mouth shapes corresponding to a single phoneme.

After the registration pixels are aligned, the mouth shape is composited over the head to produce an animation frame comprising a head and a mouth shape as if they were drawn together. In one embodiment, the head and mouth shape can be further composited over a background. In another embodiment, the image frame includes both the head and the background.

As discussed above, this process is repeated for every time segment in the animation, defined by the frame rate of the animation. Note that if several consecutive animation frames have the same mouth shape, the mouth shape may still need to be aligned since the head may move as the sequence of image frames progresses.

3. Adding Pre-Animated Scenes

Once the animated sequence having synchronized audio and visual characteristics is complete, one embodiment of animation compositing and display module 44 allows for the addition of pre-animated sequences to the beginning and/or end of the animated sequence created by the user. As discussed above, the entire sequence can then be transformed into a multimedia movie according to conventional techniques.

4. Real-Time Playback

In another embodiment, the apparatus of the present invention includes a real-time playback mode. In one embodiment, this option allows the user to preview the resulting animation before saving it in a digital file animation format. In another embodiment, the real-time playback mode enables real-time animation of chatroom discussions or other communications over computer networks. (See Section E, infra.)

FIG. 6 illustrates a method providing a real-time playback mode for use in the present invention. According to this method, when playback of the audio data begins (FIG. 6, step 512), time controller/sampling module 42 detects or keeps track of the playback time (FIG. 5, step 516). In one embodiment, the delay, TD, in compositing and displaying an animation frame is added to the playback time (FIG. 5, step 518). This time value is used to retrieve the image frame corresponding to the playback time (step 520) and sample the event sequence (FIG. 5, step 522) in order to retrieve the corresponding mouth shape. The image frame and the mouth shape are combined, as discussed above, to create an animation frame (FIG. 6, step 524), which is displayed to the user (step 526). This real-time loop is repeated for the duration of the event sequence (FIG. 6, step 514). In one embodiment, the user interface allows the user to stop the animation at any time during playback. Optionally and in one embodiment, the first animation frame is assembled and displayed before audio playback begins. (See FIG. 6, steps 502, 504, 506, 508 and 510).

E. Application to Computer Network

As FIG. 7 shows, one embodiment of the present invention can be applied to a computer network. According to this embodiment, animation system 30 comprises communications server 32 operably connected to animation server 34 and computer network 60. Users at client computers 70 input and record audio data using microphones 72 and transmit the audio data to animation server 34 via web server 32. As with some of the embodiments described above, users select from one of a plurality of animated characters and background scenes to combine with the audio data. Animation server 34 then constructs an animated sequence as described above. According to one embodiment, users can preview the animation by using the real-time playback mode. After the animated sequence is generated, one embodiment allows the option to specify the digital animation format into which the animated sequence is to be converted. Users can download the resulting file on client computer 70 and/or transmit the animation file to others, for example, as an e-mail attachment.

In one embodiment, users input and record audio data employing existing audio facilities resident on client computer 70. Users then access animation system 30 and transmit the audio data. In another embodiment, users access animation system 30, which downloads a module that allows the user to input and record audio data and transmit the audio data to animation system 30. In one embodiment, such a module is a Java applet or other module. In another embodiment, the module comprises native code. In another embodiment, the recording module could be downloaded and installed as a plug-in to the browser on client computer 70.

The present invention can also be integrated into a chatroom environment. In one embodiment, users at client computers 70 connected to computer network 60 log into a chatroom by accessing a chatroom server, as is conventional. In one embodiment, the chatroom page displays one to a plurality of animated characters each controlled by the audio data transmitted by a chatroom user. According to this embodiment, using microphone 72, a user enters audio data into client computer 70, which is recorded in digital form and sent to all other chatroom users as a WAV or other sound file. As discussed more fully below, a phonetic code sequence or an event sequence is also transmitted with the audio data. These data are then used to control the lip/mouth movements of the animated character corresponding to the user.

1. Transmitting a Phonetic Code Sequence or Event Sequence

In one embodiment, a client computer 70 includes the functionality to generateda phonetic code sequence from the audio data. In one form of this embodiment, a phonetic code sequence module is downloaded to client computer 70 when the user logs into the chatroom. In another form, the module is installed as a client-side plug-in or downloaded as a Java applet. In any form of this embodiment, the phonetic code sequence module detects a phonetic code sequence in the audio data. In one embodiment, this phonetic code sequence is transmitted in connection with the audio data to the chatroom server, which transmits the data to other chatroom users (see below).

In another embodiment, an event sequencing module is also transmitted as a plug-in or applet to client computer 70, when the user logs into the chatroom. In this form, the event sequence module generates an event sequence from the phonetic code sequence (see discussion, supra). Accordingly, the event sequence and audio data are transmitted to the chatroom server for transmission to other users. In another embodiment, the phonetic code sequence and event sequence modules are stored permanently on client computer 70.

In one embodiment, the chatroom server constructs an animation frame or animation sequence and transmits the animation frame and streaming audio data to other chatroom users. According to this embodiment, the chatroom server generates subsequent animation frames, according to the real-time playback mode discussed above (see FIG. 6), and transmits these animation frames to the chatroom users. Accordingly, users at client computers 70 hear the audio data and view an animation sequence synchronized with the audio data.

2. Receiving Audio Data and Phonetic Code or Event Sequence

According to another embodiment, client computers include the functionality to receive a phonetic code or event sequence and construct an animation sequence in synchronization with the audio data.

In one form, client computers 70 each include the functionality necessary to composite and display animation frames integrated with a computer network communications application, such as a browser or other communications device. In one form, client computers 70 include a mouth shape and image frame database, a time controller/sampling module and an animation compositing and display module (see above). According to this embodiment, the image frame database stores a sequence of image frames. In one form, since the duration of the chatroom session is unknown, the animation compositing module is configured to loop the sequence of image frames by starting at the first image frame in the sequence after it has reached the end. In any form, client computers display the animated chatroom characters and receive data packets, which control the mouth movements of the displayed characters. According to embodiment, the recipient client computers 70 receive a packet of audio data and a corresponding phonetic code or event sequence from the chatroom server. In one embodiment, client computer 70 then plays back the audio data to the user and constructs and displays a series of animation frames from the received phonetic code or event sequence, according to the real-time animation method illustrated in FIG. 6. In one embodiment, client computer 70 is fed a series of data packets including audio data and phonetic code or event sequences.

3. Direct Communication Between Users

Yet another embodiment of the present invention features real-time animation of a conversation between to users over a computer network. More particularly and in one embodiment, client computers 70 each display two animated characters, each representing a particular user. According to one embodiment, the respective users' computers include the functionality, described above, to record audio data, detect phonetic code sequences, generate event sequences, as well as composite and display a sequence of animated frames.

In one form of this embodiment, two users desiring to use the system access an animation control server on a computer network. The animation control server allows the users to select the animated characters they wish to display. When the users have selected the animated characters, the animation control server downloads to each computer a sequence of image frames and a set of mouth shapes for each animated character.

According to this embodiment, users speak into a microphone operably connected to their respective computers. As described above, a phonetic code sequence is detected in the resulting audio data, from which an event code sequence is generated. The audio data and the phonetic code or event sequence is transmitted as a packet to the intended recipient's computer.

In one embodiment, the recipient's computer receives the packet, and plays back the audio data while executing the real-time animation loop described in FIG. 6. Accordingly, the lip or mouth animation of these animated characters is controlled by the phonetic code or event sequences detected in the audio data on the user's computer and transmitted to the recipient computer. In one embodiment, client computers exchange packets of audio data and phonetic code or event sequences over the computer network.

With respect to the above-provided description, one skilled in the art will readily recognize that the present invention has application in a variety of contexts. The foregoing description illustrates the principles of the present invention and provides examples of its implementation. For example, although certain embodiments are described as working in conjunction with an Internet browser, the present invention may be used in connection with any suitable software application for accessing files on a computer network. Moreover, one skilled in the art will readily recognize that the implementation details and parameters of operation can be widely varied to achieve many different objectives. Accordingly, the description is not intended to limit the scope of the claims to the exact embodiments shown and described.

What is claimed is:

1. A method for generating an animated sequence having synchronized visual and audio characteristics, said method comprising the steps of
    (a) receiving audio data spanning a period of time;
    (b) detecting a phonetic code sequence in said audio data; wherein said phonetic code sequence comprises a sequence of phoneme probability sets, each of said phoneme probability sets corresponding to a given time point in said period of time and comprising at least one phonetic code and a corresponding probability value,
    (c) filtering said phonetic code sequence, over an averaging interval, to select the phonetic codes having the highest average probability values over each averaging interval in the period of time;
    wherein the filtering step comprises:
        (c1) identifying the phoneme probability sets corresponding to a first averaging interval;
        (c2) for each phonetic code in the identified phoneme probability sets, computing the average probability value; and
        (c3) selecting the phonetic code having the highest average probability value; and
        (c4) repeating steps (c1)–(c3) for the subsequent averaging intervals in the audio data;
    (d) generating an event sequence using said filtered phonetic code sequence; and
    (e) sampling said event sequence.

2. The method of claim 1 wherein the at least one phonetic code is a phoneme.

3. The method of claim 1 wherein said detecting step (b) comprises the steps of
    (b1) sampling said audio data during at least a portion of a uniform time interval;
    (b2) recording at least one phonetic code and corresponding probability value; and
    (b3) repeating steps (b1)–(b2) a desired number of times to create a phonetic code sequence.

4. The method of claim 1 wherein said receiving step (a) comprises the step of
    (a1) recording said audio data.

5. The method of claim 1 wherein said inputting step (a) comprises the step of (a1) receiving recorded audio data over a computer network.

6. The method of claim 1 wherein said generating step (c) comprises the steps of
    (c1) mapping said phonetic code sequence to a set of mouth shape identifiers;
    (c2) sequencing said mouth shape identifiers to correspond to said phonetic code sequence.

7. The method of claim 6 wherein a plurality of phonetic codes are associated with one mouth shape identifier.

8. The method of claim 6 wherein a sequence of mouth shape identifiers is associated with a phonetic code.

9. The method of claim 6 wherein a sequence of mouth shape identifiers is associated with a plurality of adjacent phonetic codes.

10. The method of claim 6 wherein a sequence of mouth shape identifiers is associated with a pair of adjacent phonetic codes.

11. The method of claim 1 wherein said generating step (c) comprises the steps of
    (c1) detecting a phonetic code transition event;
    (c2) mapping a sequence of mouth shape identifiers into said event sequence, said sequence of mouth shape identifiers associated with said phonetic code transition event.

12. The method of claim 1 wherein said sampling step (d) comprises the steps of
    (d1) mapping to the most recent mouth shape identifier in said event sequence.

13. The method of claim 1 wherein said sampling step (d) comprises the steps of
    (d1) mapping to the mouth shape identifier having the closest time value in said event sequence.

14. The method of claim 1 wherein said sampling step (d) is controlled by at least one rule.

15. The method of claim 1 wherein said sampling step (d) occurs at uniform intervals.

16. The method of claim 1 further comprising the steps of
    (e) constructing an animation frame based on said sampling step (d); and
    (f) repeating steps (d)–(e) a desired number of times.

17. The method of claim 16 wherein said constructing step (e) comprises the steps of
    (e1) retrieving an image frame;
    (e2) retrieving a mouth shape associated with the event sequence value sampled in step (d);
    (e3) adding said mouth shape to said image frame; and
    (e4) storing said frame of step (e3) in an animation sequence.

18. The method of claim 17 further comprising the step of
    (e5) repeating steps (e1)–(e4) a desired number of times.

19. The method of claim 18 wherein said sampling in step (d) occurs at uniform time intervals.

20. The method of claim 18 further comprising the step of
    (e6) perturbing said mouth shape; wherein said perturbing step (e6) is performed before said adding step (e3).

21. The method of claim 17 wherein said frame includes registration points, wherein said mouth shape also includes registration points; and wherein said registration points of said mouth shape are matched to said registration points of said frame in said adding step (e3).

22. The method of claim 21 further comprising the step of
    (e6) perturbing said mouth shape; wherein said perturbing step (e6) is performed before said adding step (e3).

23. The method of claim 17 further comprising the step of
    (e6) perturbing said mouth shape; wherein said perturbing step (e6) is performed before said adding step (e3).

24. The method of claim 23 further comprising the step of
(e7) detecting a volume sequence in said audio data; and wherein said perturbing step (e6) is influenced by said volume sequence.

25. An apparatus for generating an animated sequence having synchronized visual and audio characteristics comprising a mouth shape database and an image frame database;

an audio input module, said audio input module including a phonetic code recognition module; said phonetic code recognition module generating a phonetic code sequence; wherein said phonetic code sequence comprises a sequence of phoneme probability sets, each of said phoneme probability sets corresponding to a given time point in said period of time and comprising at least one phonetic code and a corresponding probability value, and wherein said audio input module is operative to filter said phonetic code sequence, over an averaging interval, to select the phonetic codes having the highest average probability values over each averaging interval in the period of time;

wherein to filter the phonetic code sequence, the audio input module is operative to:
(a) identify the phoneme probability sets corresponding to a first averaging interval;
(b) for each phonetic code in the identified phoneme probability sets, compute the average probability value;
(c) select the phonetic code having the highest average probability value; and
(d) repeat operations (a)–(c) for the subsequent averaging intervals in the audio data;

an event sequencing module operably connected to said audio input module, said event sequence module generating an event sequence based on said filtered phonetic code sequence;

a time control module operably connected to said event sequencing module, said time control module including a sampling module, said sampling module sampling said event sequence;

an animation compositing module operably connected to said sampling module and said mouth shape database and said animation sequence database, said animation compositing module responsive to said time control module to receive an event sequence value, said animation compositing module retrieving a mouth shape from said mouth shape database and an image frame from said image frame database and compositing said mouth shape and said image frame, said animation compositing module storing said composited animation frame in an animation sequence.

26. The apparatus of claim 25 wherein said animation compositing module generates a multimedia file including audio data and said animation sequence.

27. The apparatus of claim 25 wherein said animation compositing module links pre-animated sequences to said animation sequence.

28. The apparatus of claim 25 wherein said phonetic codes are phonemes.

29. The apparatus of claim 25 wherein said event sequencing module maps said phonetic code sequence to a set of mouth shape identifiers stored in said mouth shape database.

* * * * *

UNITED STATES PATENT AND TRADEMARK OFFICE
CERTIFICATE OF CORRECTION

PATENT NO.    : 6,766,299 B1
DATED         : July 20, 2004
INVENTOR(S)   : Bellomo et al.

It is certified that error appears in the above-identified patent and that said Letters Patent is hereby corrected as shown below:

Column 1,
Line 36, change "consiers" to -- consumers --.

Column 12,
Line 37, change "trampled" to -- the sampled --.

Column 15,
Line 44, change "generateda" to -- generate a --.

Column 16,
Line 30, insert -- this -- before "embodiment,".

Signed and Sealed this

Twenty-eighth Day of December, 2004

JON W. DUDAS
*Director of the United States Patent and Trademark Office*